(12) United States Patent
Hershkowitz et al.

(10) Patent No.: US 7,914,764 B2
(45) Date of Patent: *Mar. 29, 2011

(54) HYDROGEN MANUFACTURE USING PRESSURE SWING REFORMING

(75) Inventors: Frank Hershkowitz, Liberty Corner, NJ (US); Robert L Segarich, Flemington, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 1012 days.

This patent is subject to a terminal disclaimer.

(21) Appl. No.: 10/771,919

(22) Filed: Feb. 4, 2004

(65) Prior Publication Data

US 2004/0191166 A1 Sep. 30, 2004

Related U.S. Application Data

(63) Continuation-in-part of application No. 10/756,652, filed on Jan. 13, 2004, now abandoned.

(60) Provisional application No. 60/450,903, filed on Feb. 28, 2003.

(51) Int. Cl.
*C01B 3/24* (2006.01)

(52) U.S. Cl. ......................... 423/650; 423/651; 423/652

(58) Field of Classification Search ........... 423/650–654
See application file for complete search history.

(56) References Cited

U.S. PATENT DOCUMENTS

| | | | |
|---|---|---|---|
| 1,726,877 A | 10/1929 | Battig | |
| 2,313,157 A | 3/1943 | Linder | 252/373 |
| 2,556,835 A * | 6/1951 | Barr | 48/198.1 |
| 3,429,678 A | 2/1969 | Milbourne et al. | 48/196 |
| 4,200,682 A | 4/1980 | Sederquist | 429/17 |
| 4,240,805 A * | 12/1980 | Sederquist | 48/214 R |
| 4,293,315 A | 10/1981 | Sederquist | 48/94 |
| 4,642,272 A | 2/1987 | Sederquist | 429/17 |
| 4,751,055 A | 6/1988 | Jubin, Jr. | 422/190 |
| 4,816,353 A | 3/1989 | Wertheim et al. | 429/19 |
| 5,030,661 A * | 7/1991 | Lywood | 518/704 |
| 5,492,649 A | 2/1996 | Christensen | 252/372 |
| 5,624,964 A * | 4/1997 | Cimini et al. | 518/704 |
| 5,763,114 A * | 6/1998 | Khandkar et al. | 429/20 |
| 5,980,596 A | 11/1999 | Hershkowitz et al. | 48/127.9 |
| 5,985,178 A | 11/1999 | Long et al. | 252/373 |
| 6,103,143 A | 8/2000 | Sircar et al. | 252/373 |

(Continued)

FOREIGN PATENT DOCUMENTS

EP 0219163 A2 4/1987

(Continued)

OTHER PUBLICATIONS

U.S. Appl. No. 60/391,360.*

(Continued)

*Primary Examiner* — Jessica L Ward
*Assistant Examiner* — Paul A Wartalowicz (57) ABSTRACT

The invention provides a method for generating high pressure hydrogen at improved thermal efficiencies. First a synthesis gas stream at a first pressure is produced in a pressure swing reformer. Next the synthesis gas stream is subjected to a high temperature water gas shift process to produce a hydrogen enriched stream from which high pressure hydrogen is obtained. Specific embodiments of the invention involve: regenerating the reformer at a pressure lower than the synthesis gas generation; operating the synthesis gas generation step at conditions sufficient to provide a syn gas stream at a temperature in the range used in the water gas shift reaction; and using pressure swing adsorption to separate the hydrogen.

11 Claims, 4 Drawing Sheets

U.S. PATENT DOCUMENTS

| | | | |
|---|---|---|---|
| 6,113,874 A | 9/2000 | Kobayashi | |
| 6,210,157 B1 | 4/2001 | Kobayashi | |
| 6,299,994 B1* | 10/2001 | Towler et al. | 429/17 |
| 6,302,188 B1 | 10/2001 | Ruhl et al. | 165/10 |
| 6,312,660 B1* | 11/2001 | Yagi et al. | 423/652 |
| 6,338,239 B1* | 1/2002 | Hirata et al. | 60/775 |
| 6,749,828 B1* | 6/2004 | Fukunaga | 423/651 |
| 6,767,530 B2* | 7/2004 | Kobayashi et al. | 423/650 |
| 6,787,576 B2 | 9/2004 | Kiss et al. | |
| 6,969,506 B2* | 11/2005 | Tonkovich et al. | 423/652 |
| 7,045,553 B2 | 5/2006 | Hershkowitz | |
| 7,053,128 B2 | 5/2006 | Hershkowitz | |
| 7,217,303 B2 | 5/2007 | Hershkowitz et al. | |
| 7,491,250 B2 | 2/2009 | Hershkowitz et al. | |
| 7,503,948 B2 | 3/2009 | Hershkowitz et al. | |
| 2002/0183402 A1* | 12/2002 | Okado et al. | 518/702 |
| 2003/0113257 A1 | 6/2003 | Kobayashi et al. | |
| 2003/0235529 A1* | 12/2003 | Hershkowitz et al. | 423/652 |
| 2004/0191166 A1 | 9/2004 | Hershkowitz et al. | |
| 2005/0201929 A1 | 9/2005 | Hershkowitz et al. | |
| 2006/0183009 A1 | 8/2006 | Berlowitz et al. | |
| 2006/0188760 A1 | 8/2006 | Hershkowitz et al. | |
| 2007/0059234 A1 | 3/2007 | Agnihotri et al. | |
| 2007/0144940 A1 | 6/2007 | Hershkowitz et al. | |
| 2008/0038598 A1 | 2/2008 | Berlowitz et al. | |

FOREIGN PATENT DOCUMENTS

| | | |
|---|---|---|
| GB | 1 001 302 A | 8/1965 |
| GB | 1 011 138 A | 11/1965 |
| GB | 1365744 | 4/1974 |
| GB | 1365744 | 9/1974 |
| GB | 1421767 | 1/1976 |
| GB | 2265380 A | 9/1993 |
| GB | 2265381 A | 9/1993 |
| GB | 2265382 | 9/1993 |
| GB | 2265481 A | 9/1993 |
| SE | 148275 | 7/1919 |
| WO | 2004/000725 A1 | 6/2003 |
| WO | 04000725 A1 | 12/2003 |

OTHER PUBLICATIONS

"Conversion Catalytique et Cyclique Des Hydrocarbures Liquides et Gazeaux," Societe ONIA-GEGI 4, place des Etats-Unis 92 Montrouge, pp. 1-32.

"Conversion Catalytique et Cyclique Des Hydrocarbures Liquides et Gazeaux," Societe ONIA-GEGI 4, place des Etats-Unis 92 Montrouge, pp. 1-32.

* cited by examiner

HYDROGEN MANUFACTURE USING PRESSURE SWING REFORMING

CROSS REFERENCE TO RELATED APPLICATION

This application is a Continuation-in-Part of Non-Provisional application Ser. No. 10/756,652 filed Jan. 13, 2004 now abandoned which is based on Provisional Application No. 60/450,903 filed Feb. 28, 2003.

FIELD OF INVENTION

The present invention relates broadly to hydrogen manufacture. More particularly the invention relates to an improved process for making hydrogen which utilizes pressure swing reforming in a unique and thermally efficient way.

BACKGROUND OF INVENTION

Hydrogen is a key chemical used in many petroleum and petrochemical operations. Typically it is used in upgrading and finishing many refinery products. The hydrogen used in these processes sometimes is recovered as a by-product of another refinery process such as alkane reforming to aromatics. Another source of the hydrogen is via the steam reforming of a hydrocarbon such as methane.

In a steam reforming process, steam is reacted with a hydrocarbon containing feed to produce a hydrogen-rich synthesis gas. The general stoichiometry, as illustrated for methane, is:

$$CH_4 + H_2O \longrightarrow CO + 3H_2 \quad (1)$$

Because of the high endothermicity of the reaction, steam reforming is typically carried out in large furnaces, in which the catalyst is packed into tubes. The tubes must withstand the high pressure of the produced synthesis gas, while transmitting heat at temperatures approaching 1000° C. As described in Stanford Research Institute International Report No. 212 (1994), steam reforming process efficiency, defined as the heat of combustion of product hydrogen divided by the heat of combustion of reforming feed and furnace fuel, is approximately 74%, while the space velocity, defined as Standard Cubic Feet per Hour of $C_1$-equivalent feed/ft$^3$ of catalyst bed is 1000 hr$^{-1}$. Unfortunately, steam reforming furnaces occupy a very large volume of space, orders of magnitude greater than the tube volume, such that low productivity limits the economic attractiveness of the process. Thus, key limitations of the steam reforming process are the relatively low efficiency to hydrogen and the large volumes occupied by the steam reforming furnaces.

Sederquist (U.S. Pat. Nos. 4,200,682, 4,240,805, 4,293, 315, 4,642,272 and 4,816,353) teaches a steam reforming process in which the heat of reforming is provided within the bed by cycling between combustion and reforming stages of a cycle. As described by Sederquist, the high quality of heat recovery within the reforming bed results in a theoretical efficiency of about 97%. However, the examples and commercial projections within these patents describe a process that operates at very low productivity, with space velocities of around 95 hr$^{-1}$ (as $C_1$-equiv). Moreover, this process requires a compressor to compress the product synthesis gas to useful pressures for hydrocarbon synthesis.

Recently a highly efficient and highly productive process for producing synthesis gas in a cyclic, packed-bed operation has been discovered. In this process, the reforming step involves preheating a first zone to a temperature in the range of about 700° C. to 2000° C. and then introducing a 20° C. to 600° C. hydrocarbon-containing feed, along with steam and optionally $CO_2$ to the inlet of the first zone. Upon introduction of the reactants, the hydrocarbon is reformed into synthesis gas over a catalyst in this first zone. The synthesis gas is then passed from the first zone to a second zone, where the gas is cooled to a temperature close to the inlet temperature of the hydrocarbon feed. The synthesis gas is recovered as it exits the inlet of the second zone.

The regeneration step begins when a gas is introduced to the inlet of the second zone. This gas is heated by the stored heat of the second zone to the high temperature of the zone and carries the heat back into the first zone. Finally, an oxygen-containing gas and fuel are combusted near the interface of the two zones, producing a hot flue gas that travels across the first zone, thus re-heating that zone to a temperature high enough to reform the feed. Once heat regeneration is completed, the cycle is completed and reforming begins again.

An advantage of this process is the ability to operate the reforming step at a higher pressure than the regeneration step, thus creating a pressure swing, and producing high pressure synthesis gas.

In the generation of hydrogen via steam reforming of a hydrocarbon the stoichiometry shown in equation 1 is typically altered by subjecting the product stream to the so called water shift reaction illustrated by equation 2:

$$CO + H_2O \longrightarrow CO_2 + H_2 \quad (2)$$

The practical application of any hydrogen generation process will depend upon how well the various stages of the process can be integrated into an overall process design. The invention described herein provides a process scheme for generating hydrogen at improved thermal efficiencies and that is particularly adaptable for environments requiring hydrogen at relatively high pressures for refinery processes, for direct use as a fuel and for distribution.

SUMMARY OF INVENTION

The present invention provides an improvement in hydrogen generation by integrating pressure swing reforming, in which synthesis gas is produced, with water gas shift reaction and hydrogen separation under condition sufficient to yield high pressure hydrogen at improved thermal efficiencies. Thus in one embodiment the reforming phase of the pressure swing reforming process is conducted at relatively high pressures, for example, from about 10 to 100 bar, and the product synthesis gas is subject to a water gas shift reaction and a hydrogen separation step at substantially the same pressures thereby providing high pressure hydrogen.

Another embodiment of the invention includes recycling the flue gas from the regeneration phase of the pressure swing reforming process to the regeneration bed to reduce the amount of air needed for the regeneration phase as well as the amount of excess oxygen present therein.

Thus a preferred embodiment of the invention comprises:

(a) introducing a feed stream comprising a hydrocarbon and steam through the first end of a first zone containing bed packing materials and a steam reforming catalyst to produce at a first high pressure a synthesis gas stream containing $H_2$, CO, steam and $CO_2$;

(b) passing at least a portion of the product synthesis gas stream of step (a) to a second zone containing bed packing materials thereby transferring the sensible heat from the product to the packing materials;

(c) removing substantially all of the product synthesis gas from said second zone;

(d) passing the removed synthesis gas of step (c) to a water gas shift reactor to convert the CO with steam to $CO_2$ and $H_2$ thereby producing a product stream with increased $H_2$;

(e) introducing the product stream of step (d) to a hydrogen separator whereby hydrogen is separated therefrom and removed and a byproduct stream is obtained;

(f) introducing an oxygen-containing gas into the second end of said second zone; and (g) contacting the oxygen containing gas with a fuel at a pressure lower than said first high pressure and combusting the fuel within said zones thereby reheating the first zone and creating a flue gas which exits through the first end of said first zone.

In a particularly preferred embodiment the oxygen and fuel are combusted under conditions sufficient to provide a flue gas at a temperature higher than the temperature of the steam and hydrocarbon feed being introduced into the reforming zone and using the flue gas to provide the heat for making the steam used in the reforming stage.

Other embodiments will be described hereinafter

BRIEF DESCRIPTION OF DRAWINGS

FIGS. 3 and 4 are flow diagrams illustrating alternate embodiments of the invention.

DETAILED DESCRIPTION

In the present invention pressure swing reforming, in which synthesis gas is produced, is integrated with the water gas shift reactor and hydrogen separation to yield high pressure hydrogen. Because pressure swing reforming is a recently discovered process, the details of this process will be described first with reference to the basic two step cycle of pressure swing reforming diagrammatically illustrated in FIGS. 1a and 1b.

Figure 1A:
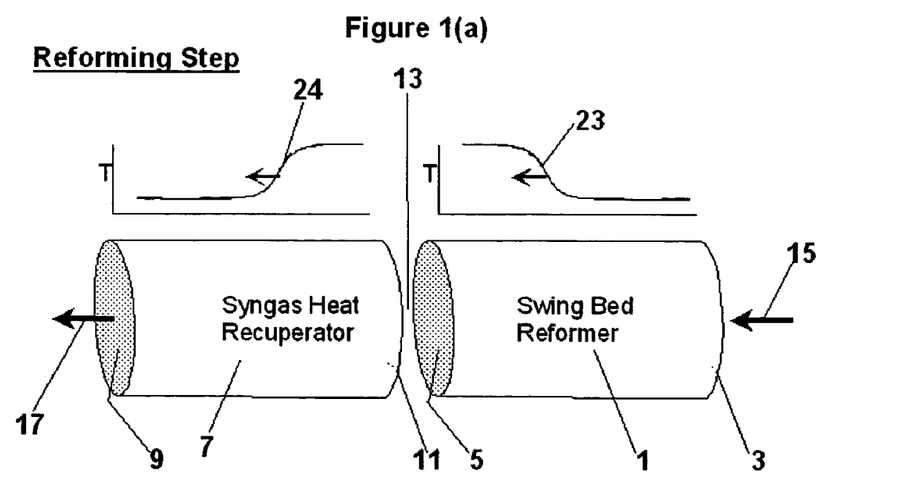
FIGS. 1a and 1b are schematic illustrations showing the basic reforming and regeneration steps of pressure swing reforming.
Figure 1B:
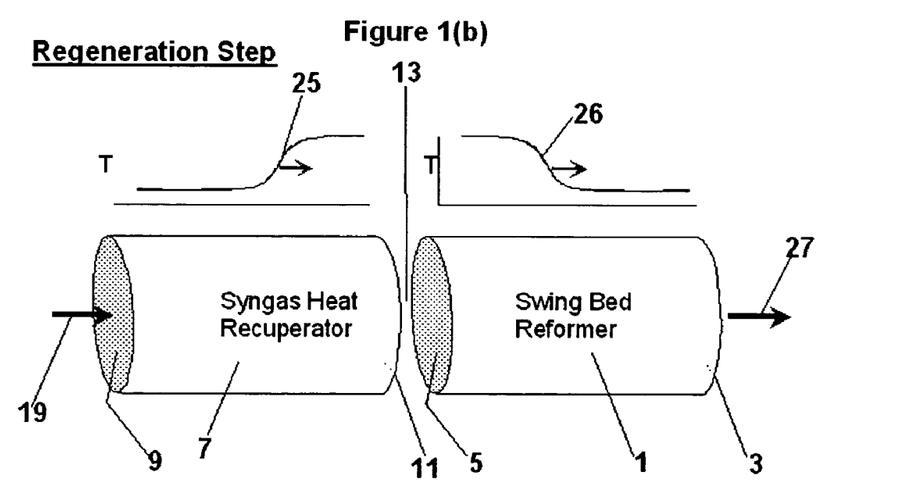

Referring now to FIGS. 1a and 1b, a first zone, or reforming zone (1), called a swing bed reformer, and a second zone, or recuperating zone, called a synthesis gas heat recuperator (7). The beds of both zones will include packing material, while the reforming bed (1) will include catalyst for steam reforming. Though illustrated as separate reforming and recuperating zones, it is to be recognized that the pressure swing reforming apparatus may comprise a single reactor.

As shown in FIG. 1a, at the beginning of the first step of the cycle, also called the reforming step, the reforming zone (1) is at an elevated temperature and the recuperating zone (7) is at a lower temperature than the reforming zone (1). A hydrocarbon-containing feed is introduced via a conduit (15), into a first end (3) of the reforming zone (1) along with steam. The hydrocarbon may be any material that undergoes the endothermic steam reforming reaction including methane, petroleum gases, petroleum distillates, kerosene, jet fuel, fuel oil, heating oil, diesel fuel and gas oil and gasoline. Preferably the hydrocarbon will be a gaseous material or one which will rapidly become substantially gaseous upon introduction into the reforming zone (1). Preferably, the steam will be present in proportion to the hydrocarbon in an amount that results in a steam to carbon ratio between about 1 and about 3 (considering only carbon in the hydrocarbon, not carbon in CO or $CO_2$ species that may be present).

This feed stream picks up heat from the bed and is converted over the catalyst and heat to synthesis gas. As this step proceeds, a temperature profile (23) is created based on the heat transfer properties of the system. When the bed is designed with adequate heat transfer capability, as described herein, this profile has a relatively sharp temperature gradient, which gradient will move across the reforming zone (1) as the step proceeds.

Synthesis gas exits the reforming bed (1) through a second end (5) at an elevated temperature and passes through the recuperating zone (7), entering through a first end (11) and exiting at a second end (9). The recuperating zone (7) is initially at a lower temperature than the reforming zone (1). As the synthesis gas passes through the recuperating zone (7), the synthesis gas is cooled to a temperature approaching the temperature of the zone substantially at the second end (9), which is approximately the same temperature as the regeneration feed introduced during the second step of the cycle via conduit (19) (e.g. from about 20° C. to about 600° C.). As the synthesis gas is cooled in the recuperating zone (7), a temperature gradient (24) is created and moves across the recuperating zone (7) during this step.

At the point between steps, the temperature gradients have moved substantially across the reforming zone (1) and the recuperating zone (7). The zones are sized so that the gradients move across both in comparable time during the above reforming step. The recuperating zone (7) is now at the high temperature and the reforming zone (1) is at low temperature, except for the temperature gradient that exists near the exits of the respective zones. The temperature of the reforming zone (1) near the inlet end (3) has now been cooled to a temperature that approaches the temperature of the hydrocarbon feed that has been entering via conduit (15) (e.g. from about 20° C. to about 600° C.).

In the practice of pressure swing reforming, there are alternative means for determining the end of the reforming step. Toward the end of the reforming step, the temperature at end (5) of the reforming zone is reduced and consequently the reforming performance deteriorates below acceptable conversion efficiencies. Reforming performance, as used herein, refers to the conversion of feed hydrocarbons into synthesis gas components of $H_2$, CO and $CO_2$. The term percent conversion, as used herein, is calculated as the percent conversion of the carbon in feed hydrocarbonaceous species into synthesis gas species of CO and $CO_2$. The term unconverted product hydrocarbons, as used herein, refers to product hydrocarbonaceous species that are not synthesis gas components of $H_2$, CO and $CO_2$. These typically include product methane, as well as feed hydrocarbons and the cracking products of feed hydrocarbons. The reforming step ends when the reforming performance deteriorates to a level that is below acceptable limits. In practice, optimization of the overall reforming and synthesis gas utilization process will dictate a desired, time-averaged level of reforming conversion. That time-averaged level of reforming conversion is typically greater than 80%, preferably greater than 90%, and most preferably greater than 95%.

The point in time at which the reforming step is ended, and thus the duration of the reforming step, may be chosen (a) as a response to the time-varying performance of the reformer during each reforming step; or (b) based on overall (time-averaged) performance or the system; or (c) fixed as a constant reforming step duration. In embodiment (a), at least one feature of the operation is monitored that is correlated to the reforming performance. This feature may be a composition such as $CH_4$, $H_2$, or CO, or alternatively a temperature, such as the temperature at the end (5) of the reforming bed. In one embodiment of the present invention, the reforming step is ended when the temperature at the end (5) of the reforming has decreased to a pre-selected temperature between about 700° C. and about 1200° C. In embodiment (b), the reforming step duration is adjusted based on a measured feature that reflects the overall (time-averaged) performance of the system. This may be an average product composition such as $CH_4$, $H_2$, or CO. In one embodiment the present invention, the reforming step duration is adjusted based on the time-averaged concentration of $CH_4$ in the product, using control strategies known in the art to shorten or lengthen the duration to achieve a predetermined target $CH_4$ amount. In a preferred embodiment, the target $CH_4$ amount is set at an amount that represents between about 1% and about 15% of the hydrocarbonaceous feed carbon. In case (c), the reforming step duration is of fixed length, at a value that is predetermined to be acceptable for the space velocity of the operation. In one embodiment the present invention, the reforming step duration is fixed at a duration between about 0.1 sec and less than about 60 seconds and preferably between about 1.0 and 30 seconds.

After the synthesis gas is collected via an exit conduit (17) at the second end (9) of the recuperating zone (7), the second step of the cycle, also called the regeneration step begins. The regeneration step, illustrated in FIG. 1b, basically involves transferring the heat from the recuperator bed (7) to the reformer bed (1). In so doing, the temperature gradients 25 and 26 move across the beds similar to but in opposite directions to gradients 23 and 24 during reforming. In a preferred embodiment, an oxygen-containing gas and fuel are introduced via a conduit (19) into the second end (9) of the recuperating zone (7). This mixture flows across the recuperating zone (7) and combusts substantially at the interface (13) of the two zones (1) and (7). In the present invention, the combustion occurs at a region proximate to the interface (13) of the recuperation zone (7) and the reforming zone (1). The term, "region proximate", in the present invention, means the region of the PSR beds in which regeneration step combustion will achieve the following two objectives: (a) the heating of the reforming zone such that end (5) of the reforming zone is at a temperature of at least 800° C., and preferably at least 1000° C. at the end of the regeneration step; and (b) the cooling of the recuperation zone to a sufficient degree that it can perform its function of accepting synthesis gas sensible heat in the subsequent reforming step. Depending on specific regeneration embodiments described herein, the region proximate to the interface can include from 0% to about 50% of the volume of the recuperation zone (7), and can include from 0% to about 50% of the volume of the reforming zone (1). In a preferred embodiment of the present invention, greater than 90% of the regeneration step combustion occurs in a region proximate to the interface, the volume of which region includes less than about 20% the volume of the recuperating zone (7) and less than about 20% the volume of reforming zone (1).

The location of combustion may be fixed by introduction of one of the combustion components, e.g., the fuel, at or substantially at, the interface of the two zones (13), while the other component, e.g., the oxygen-containing gas may be introduced at the first end (9) of the recuperating zone (7). Alternatively, the fuel and oxygen-containing gas (19) streams may be mixed at the open-end (9) of the recuperating zone (7) and travel through the zone and combust at the interface of the zones (13). In this embodiment, the location of combustion is controlled by a combination of temperature, time, fluid dynamics and catalysis. Fuel and oxygen conventionally require a temperature-dependent autoignition time to combust. In one embodiment, the flow of a non-combusting mixture in a first substep of regeneration will set the temperature profile in the recuperating zone (7) such that the zone is not hot enough to ignite until the mixture reaches the interface of the zones.

The presence of catalyst in the reforming zone can also be used to initiate combustion at that location, and a space between the reforming and recuperating zones can be added and designed to further stabilize the combustion process and confine the combustion to the area proximate to the above described interface. In yet another embodiment, the location of combustion is fixed by mechanical design of the recuperating zone. In this design, the fuel and oxygen-containing gas are travelling in separate channels (not shown), which prevent combustion until the feeds combine at the interface of the zones (13). At that location, flame holders (not shown) or a catalyst in the reforming zone will ensure that the combustion occurs.

The combustion of the fuel and oxygen-containing gas creates a hot fluegas that heats the reforming zone (1) as the flue gas travels across that zone. The fluegas then exits through the first end of the reforming zone (3) via a conduit (27). The composition of the oxygen-containing gas/fuel mixture is adjusted to provide the desired temperature of the reforming zone. The composition and hence temperature is adjusted by means of the proportion of combustible to non-combustible portions of the mixture. For example, non-combustible gases such as $H_2O$, $CO_2$, and $N_2$ can be added to the mixture to reduce combustion temperature. In a preferred embodiment, non-combustible gases are obtained by use of steam, flue gas, or oxygen-depleted air as one component of the mixture. When the hot fluegas reaches the temperature gradient within the reformer, the gradient moves further across the bed. The outlet temperature of the fluegas will be substantially equal to the temperature of the reforming zone (1) near the inlet end (3). At the beginning of the regeneration step, this outlet temperature will be substantially equal to the inlet temperature of the reforming feed of the preceding, reforming, step. As the regeneration step proceeds, this outlet temperature will increase slowly and then rapidly as the temperature gradient reaches end (3), and can be 50-500° C. above the temperature of the reforming feed by the end of the step.

In the practice of pressure swing reforming, there are alternative means for determining the end of the regeneration step. The regeneration step ends when sufficient heat has been supplied or conveyed to the reforming bed to enable the carrying out of the reforming step. The point in time at which the regeneration step is ended, and thus the duration of the regeneration step, may be chosen (a) as a response to the time-varying performance of the PSR during each regeneration step; or (b) based on overall (time-averaged) performance or the system; or (c) fixed as a constant regeneration step duration. In embodiment (a), some feature of the operation is monitored that is related to the regeneration performance. This feature could be a composition such as $O_2$, $CH_4$, $H_2$, or CO, or could be a temperature such as the temperature at the end (3) of the reforming bed. In one embodiment of the present invention, the regeneration step is ended when the temperature at the end (3) of the reforming bed has increased to a pre-selected temperature between about 200° C. and about 800° C. In embodiment (b), the regeneration step duration is adjusted based on a measured feature that reflects the overall (time-averaged) performance of the system. This feature may be an average product composition such as $CH_4$, $H_2$, or CO, or some other system measurement. In one embodiment of the present invention, the regeneration step duration is adjusted based on the time-averaged concentration of $CH_4$ in the product, using control strategies known in the art to shorten or lengthen the duration to achieve the target $CH_4$ amount. In a preferred embodiment, the target $CH_4$ amount is set at an amount that represents between about 1% and about 15% of the hydrocarbonaceous feed carbon. In embodiment (c), the regeneration step duration is of fixed length, at a value that is predetermined to be acceptable for the space velocity of the operation. In one embodiment the present invention, the regeneration step duration is fixed at a duration between about 0.1 second and about 60 seconds and preferably 1.0-30 seconds. In all of these cases, but particularly in embodiment (c), it is preferable to also adjust the regeneration flow rates to increase or decrease the amount of heat added to the bed during the step—in a manner similar to that described with respect to adjustment of duration in embodiment (b), above. In a further embodiment of the present invention, the regeneration step duration is fixed at a duration between about 1 second and about 60 seconds, and the regeneration flow rate is adjusted over time so that the time-average concentration of CH4 in the reforming product approaches a target $CH_4$ amount that is set at an amount that represents between about 1% and about 15% of the hydrocarbonaceous feed carbon.

The reforming zone is now, once again, at reforming temperatures suitable for catalytic reforming.

In pressure swing reforming the two steps of the cycle are conducted at different pressures, that is, the reforming step is typically carried out at higher pressures than the regeneration step. The reforming step pressures range from about ten (10) atmospheres (absolute pressure) to about one hundred (100) atmospheres. Regeneration step pressures range from about one atmosphere to about twenty (20) atmospheres. Unless otherwise stated, pressures are identified in units of absolute pressure. The pressure swing is enabled in principle part to the large volumetric heat capacity difference between the solid bed packing material and the gases.

The space velocity of a system is typically expressed on an hourly basis as the standard volumetric gas flow rate of feed divided by the volume of catalyst bed, called gaseous hourly space velocity, or GHSV. Space velocity can also be defined in terms of the hydrocarbon component of feed. As so defined, the GHSV for a methane feed would be the standard hourly volumetric gas flow rate of methane divided by the bed volume. As used herein, the term space velocity, abbreviated as $C_1GHSV$, refers to the space velocity of any hydrocarbon feed placed on a $C_1$ basis. As such, the hydrocarbon feed rate is calculated as a molar rate of carbon feed, and standard volume rate calculated as if carbon is a gaseous species. For example, a gasoline feed having an average carbon number of 7.0 that is flowing at a gaseous flow rate of 1,000 NL/hr into a 1.0 L bed would be said to have a space velocity of 7,000. This definition is based on feed flow during the reforming step and wherein the bed volume includes all catalysts and heat transfer solids in the reforming and recuperating zones.

In pressure swing reforming, the space velocity, $C_1GSHSV$, typically ranges from about 1,000 to about 50,000.

In a preferred embodiment pressure swing reforming is conducted under bed packing and space velocity conditions that provide adequate heat transfer rates, as characterized by a heat transfer parameter, $\Delta T_{HT}$, of between about 0.1° C. to about 500° C., and more preferably between about 0.5° C. and 40° C. The parameter $\Delta T_{HT}$ is the ratio of the bed-average volumetric heat transfer rate that is needed for reforming, H, to the volumetric heat transfer coefficient of the bed, $h_v$. The volumetric heat transfer rate that is needed for reforming is calculated as the product of the space velocity with the heat of reforming (on heat per $C_1$ volume basis). For example, H=4.9 cal/cc/s=2.2 cal/cc*8000 $hr^{-1}$/3600 s/hr, where 2.2 cal/cc is the heat of reforming of methane per standard volume of methane, and 8000 is the $C_1GHSV$ of methane. When the duration of reform and regeneration steps are comparable, the value of H will be comparable in the two steps. The volumetric heat transfer coefficient of the bed, $h_v$, is known in the art, and is typically calculated as the product of a area-based coefficient (e.g. $cal/cm^2s°$ C.) and a specific surface area for heat transfer ($a_v$, e.g. $cm^2/cm^3$), often referred to as the wetted area of the packing.

Bed packing materials suitable for use in the pressure swing reforming process include cordierite, aluminum silicate clays, mullite, silica-alumina, zirconia and the like that are stable to at least 1000° C. Suitable reforming catalysts include noble, transition, and Group VIII components, as well as Ag, Ce, Cu, La, Mo, Mg, Sn, Ti, Y, and Zn, or combinations thereof. Preferred catalyst systems include Ni, NiO, Rh, Pt, and combinations thereof. These materials may be deposited or coated on, or in, catalyst supports well known in the art.

Figure 2:
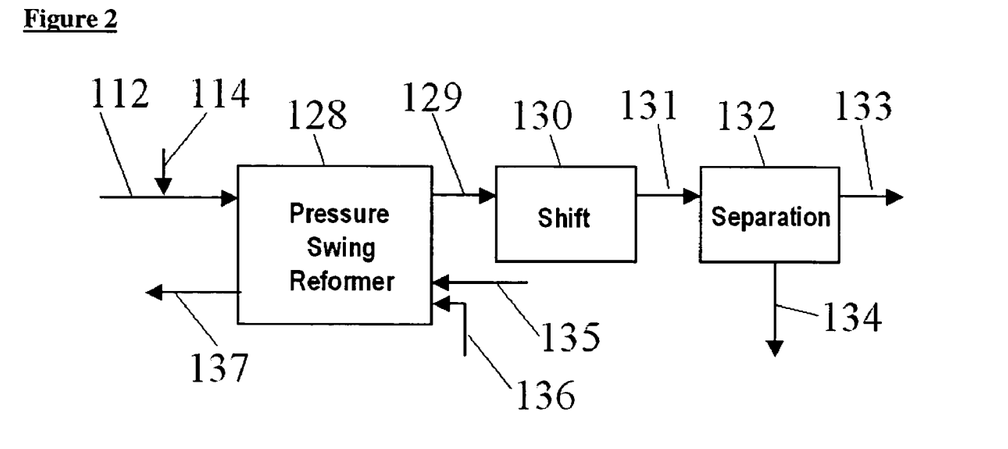
FIGS. 2 to 4 are schematic illustrations of process designs employing pressure swing reforming in hydrogen manufacture.

Turning to FIG. 2, which illustrates one embodiment of the present invention a pressure swing reformer (128) is in operable communication with a high temperature water gas shift reactor (130) and a hydrogen separator, e.g., a pressure swing absorption unit, (132). A hydrocarbon feed (112), e.g., methane, and steam (114) are passed through the pressure swing reformer (128) for conversion therein to synthesis gas. The synthesis gas (129) is fed to the high temperature shift reactor (130) where the CO levels in the synthesis gas are reduced and additional hydrogen is produced (illustrated supra in equation 2).

The regeneration step of the pressure swing reformer (128) is carried out by introducing a fuel (135) and an oxygen containing gas (136), e.g., air, into the reformer (128) for combustion therein. Typically the regeneration feed will be at a temperature in the range of about 20° C. to 600° C. and preferably at 150° C. to 450° C. The regeneration cycle will be operated at pressures in the range of about 1 to about 10 bar, and preferably in the range of about 1 to about 5 bar.

In a preferred embodiment, the pressure swing reformer is operated with a regeneration feed (combination of 135 & 136) temperature and pressure, and with swing reformer recuperating zone properties, including zone size and packing $\Delta T_{HT}$, that result in a synthesis gas (129) temperature that substantially matches the selected inlet temperature of the shift reactor (130). Typical recuperating zone design will include a length that is in the range of about 25% to 40% of the total pressure swing reformer bed length, and packing that provides a $\Delta T_{HT}$ in the range of about 1° C. to about 40° C. Typically regeneration inlet temperatures are in the range of about 200° C. to 350° C. with outlet syngas temperatures of about 220° C. to about 400° C. High temperature shift reactors are normally operated at inlet temperatures of about 250° C. to about 400° C. Thus, for example, operating the pressure swing reformer with a regeneration inlet temperature of about 250° C. can provide a syngas at a temperature of about 290° C., which is a temperature suitable for the shift reaction.

In a preferred embodiment, the reforming cycle is operated at a high pressure sufficient to provide hydrogen after shift and separation at a high pressure that at least matches the pressure required for the intended use. Typically the reforming cycle is operated at pressures greater than about 10 bar and preferably at pressures in the range of about 10 to 100 bar. When the reforming step is executed at high pressure, it may be desirable to include a brief period of inert purge at the end of the reforming step to sweep remaining product from the void fractions of the bed. In a preferred embodiment, this inert purge is composed predominantly of steam.

Additionally the hydrocarbon (112) and steam (114) feed are passed through the reformer (128) at a space velocity ($C_1$GHSV) in the range of about 1000 to 50,000 $hr^{-1}$, more preferably in the range of about 2000 $hr^{-1}$ to about 25,000 $hr^{-1}$.

In the embodiments herein utilizing pressure swing reforming the bed packing material employed in relatively large volume applications, for example, in applications producing more than 100 kg $H_2$/hr, typically will be in the form of honeycomb monoliths and wall-flow monoliths, which have straight channels to minimize pressure drop and enable greater reactor length. Preferred honeycomb monoliths for the present invention will have channel densities that range from about 100 cells/$in^2$ to about 1600 cells/$in^2$ (15-250 cells/$cm^2$). In smaller scale operations, more tortuous packing, such as foam monoliths and packed beds may be employed. Preferred foam monoliths for the present invention will have pore densities that range from about 10 ppi (pores per inch) to about 100 ppi (4-40 pore/cm). Preferred packed beds for the present invention will have packing with specific surface area that range from about 100 $ft^{-1}$ to about 2000 $ft^{-1}$ (3.3-65 $cm^{-1}$).

As stated, the synthesis gas (129) is fed to the high temperature shift reactor (130) where the CO levels in the synthesis gas (129) are lowered and additional hydrogen is produced. The high temperature shift reaction is a process well known in the art. Typically, the process is conducted in one or two stages at temperatures of about 250° C. to about 400° C. in the presence of an iron oxide-chromium oxide catalyst. Typically, the reforming reaction is carried out with sufficient excess of steam to satisfy the needs of the shift reaction. The shift can include a second, low-temperature, stage, having inlet temperatures of 150 to 250° C. and using a catalyst that is typically copper oxide-zinc oxide supported on alumina. Indeed, a second low temperature shift step is preferred when $CO_2$ is to be recovered as a product. In any event, the product gas stream (131) is then passed through a hydrogen separator (132), i.e., a pressure swing adsorption unit where everything in the gas stream (131) but hydrogen is adsorbed. The hydrogen (133) exiting the separation unit (132) will, of course, be at a predetermined high pressure based on the pressure at which the reforming cycle was operated. As is known in pressure swing adsorption the bed is desorbed of adsorbed materials by depressurization and purging to provide a purged gas stream (134). Purging typically is done with hydrogen.

Figure 3:
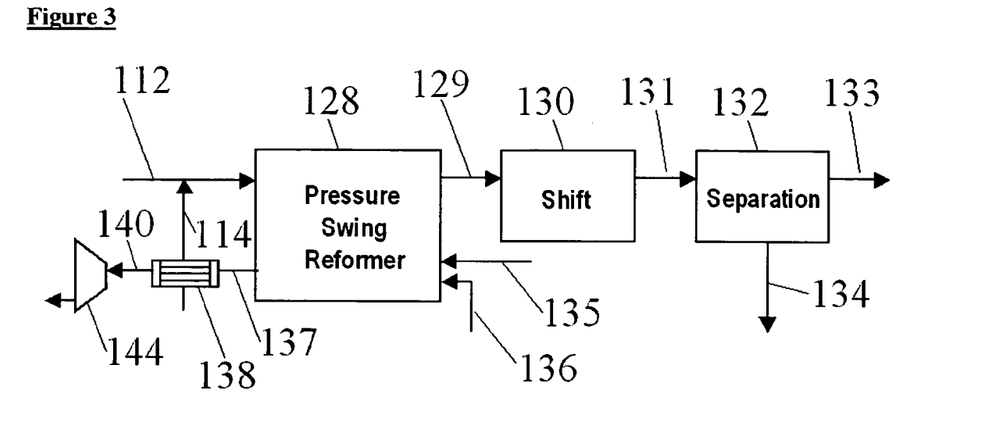
Figure 4:
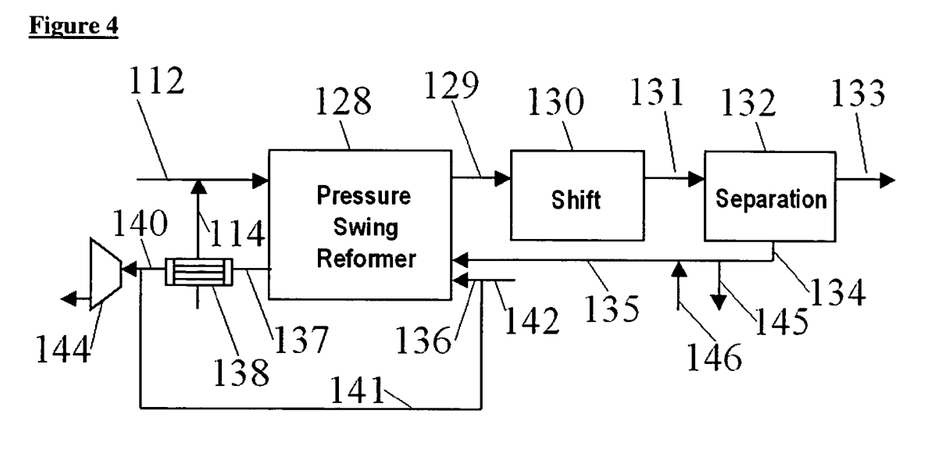

Hydrogen separation technologies that may be used in the present invention include absorption processes, cryogenic processes, pressure- and temperature-swing adsorption processes and membrane separation processes. Absorption processes typically utilize amines or potassium carbonate-based solutions to remove CO2. In a preferred embodiment, the hydrogen separator (132) is a pressure swing adsorption separation system. FIGS. 3-5 show streams passing from one block to the next without any heat exchange or conditioning. Indeed, an advantage of the present invention is that pressure swing reforming syngas effluent (129) conditions can be tuned to require no conditioning prior to introduction into the shift reactor (130). However, it is understood that conditioning as is known in the art may be applied to these streams. For example, heat exchange may be applied to adjust temperatures. The separation step (132) generally requires synthesis gas at conditions different from the exit conditions of the shift step (130). In a preferred embodiment, synthesis gas (131) exiting the high temperature shift is cooled and dried prior to introduction into the pressure swing adsorption step, as is known in the art.

The reforming inlet stream is composed of hydrocarbon (112) and steam (114). These streams may be preheated to any level that is economically achievable with heat available around the process. Typically, the steam (114) will be available at about the boiling temperature that corresponds to the pressure of reformer operation, typically 200° C. to 300° C. Waste heat is typically available that can heat the reforming feeds to temperatures in the range of 200° C. to 400° C. Increasing the preheat will improve hydrogen plant efficiency at a cost of added heat exchange. This tradeoff is well known in the art, and can be optimized by one skilled in the art for any given situation of capital and energy cost. The incoming reforming feed temperature sets a lower limit on the temperature of the outgoing fluegas (137). However, the temperature of the outgoing fluegas is also strongly influenced by the temperature that remains in the reforming section of the bed (1) at the end of the reforming step. That remaining temperature is strongly influenced by the kinetics of reforming, the pressure, and space velocity. Under the conditions described herein, the flue gas (137) will be at temperatures in the range of about 400° C. to about 500° C.

In one embodiment of the invention the regeneration is conducted under conditions sufficient to provide a flue gas at a temperature in the range of about 400° C. to about 500° C. In this embodiment shown in FIG. 3 the flue gas (137) is used in steam generator (138) for making steam (114) used in the feed during reforming. After generating steam the flue gas (140) exits the steam generator (138). This flue gas may be used, if desired, to power a turbine (144).

In another embodiment shown in FIG. 4 the purge stream (134) is introduced as fuel (135) for regeneration of the pressure swing reformer. In one preferred embodiment, the amount of purge (134) is roughly equal to the amount of fuel (135) needed for regeneration. In other embodiments, an excess of purge may be removed as a product fuel gas stream (145) or an insufficiency of purge may be made up with an additional fuel stream (146).

In one embodiment of the present invention the air (142) shown in FIG. 4 is provided by means of blower equipment. The turbine expander (144), if it is used, will recover work energy that may be used to drive the air blower. In one embodiment of the present invention, this blower-expander pair is mechanically coupled to provide for improved cost or efficiency. In such an embodiment the pressure of PSR regeneration is preferably from about 2 atm. To about 10 atm. (absolute).

In another embodiment of the present invention, this blower-expander function is provided by integrating the PSR regeneration system with a gas turbine. Gas turbines operate by compressing air to moderate pressure (7-30 atm), combusting a fraction of that air with fuel such that the combined stream of air and combustion product is heated to elevated temperature (900-1300 C), and then expanding the combined stream in a turbine resulting in mechanical power sufficient to drive the compressor and have residual power that may be used for electricity manufacture or other purposes. It is known in the art that hot compressed air can be withdrawn from gas turbines, used in outside processes, and returned with some composition and condition changes to the turbine to fulfil its role as combustion diluent and expansion fluid.

In such an embodiment, the regeneration fresh air (142) is provided as air that is extracted from a gas turbine, and a fraction of the regeneration flue gas is returned to the gas turbine to fulfil the gas turbine needs for combustion diluent and expansion fluid. In this embodiment, the pressure of regeneration in PSR will preferably be from about 7 atm. To about 20 atm. (absolute). As shown in FIG. 4, the regeneration flue gas may be cooled prior to its return to the turbine as a fraction of stream (140). Alternatively, a fraction of stream (137) may be returned to the turbine, with the remaining fraction cooled (138) and recycled (141). The gas turbine power output may be used to co-produce electricity or to power the electrical and driver needs of the overall process. The choice of gas turbine equipment is a matter of scale, process economics, and desired proportions of power to hydrogen product.

In another embodiment shown in FIG. 4, Flue gas (140) from the steam regenerator (138) is recycled (141) to the pressure swing reformer (128). This recycling of some flue gas will reduce the amount of fresh air needed and is reduce excess oxygen in the bed.

The foregoing embodiments have been described in connection with a simple pressure swing reformer; however, in alternate embodiments two pressure swing reformer beds are used simultaneously such that one system is reforming while the other is regenerating. This use of multiple beds provides a continuous flow of reformed product to the shift reactor notwithstanding the cyclical operation of each bed. Appropriate valving is used to control the various streams flowing to and from the beds.

To further illustrate the invention the calculated heat and material balance for the embodiment shown in FIG. 4 is given in Table 1. This pressure swing reformer system is operated as two cylindrical reactors, with internal dimensions of 7 ft (2.1M) diameter and 4 ft (1.2M) length. The reactors are positioned with cylindrical axis in a vertical orientation, and reforming is carried out as upflow; regeneration as downflow. The packing is composed of 400 cell/in² (62 cell/cm²) honeycomb monolith having a bulk density of 50 lb/ft³ (0.8 g/cc). The bottom two thirds of the packing include reforming catalyst. Overall cycle length is 30 seconds; 15 s for the regeneration step and 15 seconds for the reforming step. A brief steam purge is included at the end of the reforming step.

TABLE 1

| Stream No. on FIG. 4 | | | | | |
|---|---|---|---|---|---|
| 114 | 112 | 129 | 131 | 133 | 134 |
| Temp. ° C. | | | | | |
| 229 | 239 | 292 | 404 | 43 | 43 |
| Pressure, atm abs | | | | | |
| 27.2 Steam | 25.0 NG Feed | 25.0 Raw SG | 24.3 HTS Eff. | 21.4 H2 Prod. | 1.4 Purge |
| kgmoles/hr H2 | | | | | |
| 0 | 0 | 2,533 | 2,932 | 2,492 | 440 |
| N2 | | | | | |
| 0 | 0 | 1 | 1 | 0 | 1 |
| O2 | | | | | |
| 0 | 0 | 0 | 0 | 0 | 0 |
| CO | | | | | |
| 0 | 0 | 718 | 317 | 0 | 317 |
| CH4 | | | | | |
| 0 | 834 | 20 | 20 | 0 | 20 |
| CO2 | | | | | |
| 0 | 0 | 95 | 490 | 0 | 490 |
| H2O | | | | | |
| 1,671 | 0 | 746 | 360 | 0 | 14 |
| ΔHc, MW | | | | | |
| 0 | 186 | 230 | 225 | 167 | 58 |
| Stream No. on FIG. 4 | | | | | |
| 135 | 142 | 141 | 136 | 137 | 140 |
| Temp. ° C. | | | | | |
| 108 | 204 | 273 | 255 | 454 | 260 |
| Pressure, atm abs | | | | | |

TABLE 1-continued

| | 3.4 Reg. Fuel | 3.4 Air | 3.4 Rcy FG | 3.4 Comb. Ox | 3.2 Hot FG | 3.1 Cool FG |
|---|---|---|---|---|---|---|
| kgmoles/hr H2 | 440 | 0 | 0 | 0 | 0 | 0 |
| N2 | 1 | 1,839 | 2,489 | 4,328 | 4,328 | 4,328 |
| O2 | 0 | 460 | 2 | 462 | 43 | 43 |
| CO | 317 | 0 | 0 | 0 | 0 | 0 |
| CH4 | 20 | 0 | 0 | 0 | 0 | 0 |
| CO2 | 490 | 0 | 1,224 | 1,224 | 2,051 | 2,051 |
| H2O | 14 | 0 | 710 | 710 | 1,203 | 1,203 |
| ΔHc, MW | 58 | 0 | 0 | 0 | 0 | 0 |

What is claimed is:

1. A method for producing high pressure hydrogen comprising:
    (a) passing a feed stream under high pressure conditions and comprising a hydrocarbon and steam through a first zone containing packing materials and a steam reforming catalyst at an elevated temperature to produce a high pressure synthesis gas stream;
    (b) passing at least a portion of the synthesis gas stream of step (a) through the first end of a second zone containing bed packing materials at a temperature lower than the first zone thereby transferring sensible heat from the product to the packing material in the second zone and providing a high pressure synthesis gas at a temperature approaching that of the packing material at the second end;
    said steps (a) and (b) being conducted at a space velocity $C_1GHSV$ of at least 1000 hr$^{-1}$, and a heat transfer parameter $\Delta T_{HT}$ between about 0.1° C. and 500° C., and at conditions sufficient to provide a regeneratively cooled synthesis gas at said second end of said second zone in the range of about 220° C. to about 400° C.;
    (c) removing substantially all of the high pressure synthesis gas from the second zone and introducing said gas into a high temperature water-gas shift reaction zone to provide a gas stream enriched in hydrogen;
    (d) passing the hydrogen enriched gas stream through a hydrogen separation zone to separate high pressure hydrogen;
    (e) removing high pressure hydrogen from the separation zone;
    (f) introducing a mixture of a fuel and an oxygen containing gas, at a pressure lower than in step (a) into the second end of the second zone for combustion and passage through said second and first zone thereby heating the first zone to reforming temperatures and creating a regeneratively cooled flue gas which exits through the first end of the first zone.

2. The method of claim 1 wherein sufficient fuel and oxygen are combusted in the regeneration cycle to generate a regeneratively cooled flue gas exiting the reformer at a temperature in the range of about 300° C. to about 600° C.

3. The method of claim 1 including recycling a portion of the flue gas to the pressure swing reformer during the regeneration cycle.

4. The method of claim 1 wherein the oxygen in the regeneration cycle is provided as compressed air from a gas turbine.

5. The process of claim 1 wherein the oxygen containing gas of step (f) is provided as compressed air from a gas turbine.

6. The method of claim 1 wherein the packing material of said first and second zones are composed of materials selected from the group consisting of magnesium aluminum silicates, aluminum silicate clays, millite, alumina, silica-alumina, zirconia and mixtures thereof.

7. The method of claim 1 wherein the hydrogen separation zone is a pressure swing adsorption zone whereby substantially all of the components of the product gas stream other than hydrogen are adsorbed.

8. The method of claim 7 wherein the high pressure conditions are in the range of about 10 to about 100 bar.

9. The method of claim 8 including purging the pressure swing adsorption zone to provide a purge gas stream and introducing at least a portion of the purge gas stream as the fuel in step (f).

10. The method of claim 9 wherein the regeneration is conducted under conditions sufficient to provide a flue gas having time-average temperature range of about 400° C. to about 500° C. and the regeneratively cooled flue gas is passed through a heat exchanger to generate steam for reforming step (a).

11. The method of claim 10 wherein at least part of the flue gas passed through the heat exchanger is recycled to the second end of the second zone during regeneration.

* * * * *